(12) United States Patent
Liu et al.

(10) Patent No.: US 12,311,899 B1
(45) Date of Patent: May 27, 2025

(54) BRAKE-BY-WIRE (BBW) ELECTRONIC CONTROL ACTUATOR UNIT AND USE THEREOF

(71) Applicant: GLOBAL TECHNOLOGY CO., LTD, Nantong (CN)

(72) Inventors: Zhaoyong Liu, Nantong (CN); Xun Li, Nantong (CN); Bing Wang, Nantong (CN); Qian Zhang, Nantong (CN)

(73) Assignee: GLOBAL TECHNOLOGY CO., LTD, Nantong (CN)

( * ) Notice: Subject to any disclaimer, the term of this patent is extended or adjusted under 35 U.S.C. 154(b) by 0 days.

(21) Appl. No.: 18/893,915

(22) Filed: Sep. 23, 2024

Related U.S. Application Data

(63) Continuation of application No. PCT/CN2024/103261, filed on Jul. 3, 2024.

(30) Foreign Application Priority Data

Jan. 16, 2024 (CN) .......................... 202410061303.8

(51) Int. Cl.
*B60T 13/74* (2006.01)
(52) U.S. Cl.
CPC .......... *B60T 13/746* (2013.01); *B60T 13/743* (2013.01)
(58) Field of Classification Search
CPC ............. F16D 2125/48; F16D 2127/06; B60T 13/741; B60T 13/743; B60T 13/746
See application file for complete search history.

(56) References Cited

U.S. PATENT DOCUMENTS

| | | | | |
|---|---|---|---|---|
| 7,516,823 | B2* | 4/2009 | Kikuchi | H02K 5/225 188/158 |
| 2007/0199775 | A1* | 8/2007 | Yasukawa | B60T 13/741 188/73.1 |
| 2016/0017942 | A1* | 1/2016 | Kwon | F16D 65/18 188/162 |

FOREIGN PATENT DOCUMENTS

| | | |
|---|---|---|
| CN | 102537338 A | 7/2012 |
| CN | 102678916 A | 9/2012 |
| CN | 104653304 A | 5/2015 |
| CN | 107614919 A | 1/2018 |
| CN | 110529592 A | 12/2019 |

(Continued)

OTHER PUBLICATIONS

English Abstract of DE 102009046044 (no date).*

*Primary Examiner* — Nicholas J Lane
(74) *Attorney, Agent, or Firm* — Bayramoglu Law Offices LLC

(57) ABSTRACT

The provided are a brake-by-wire (BBW) electronic control actuator unit and a use thereof. The BBW electronic control actuator unit includes a machine body, as well as a permanent magnet brushless direct-current motor (PMBDCM) and speed-reducing torque-increasing gear sets integrated in the machine body, where the PMBDCM includes a stator assembly and a rotor assembly; the rotor assembly is connected to one end of a motor shaft; the other end of the motor shaft is connected to an input end of each of the speed-reducing torque-increasing gear sets; an output end of the speed-reducing torque-increasing gear set is connected to an output shaft; and the output shaft extends out of the machine body. According to the BBW electronic control actuator unit and the use thereof, by assembling the PMBDCM and the speed-reducing torque-increasing gear set, there are advantages of a high mounting accuracy, and a compact structure.

16 Claims, 6 Drawing Sheets

(56) References Cited

FOREIGN PATENT DOCUMENTS

| | | | | |
|---|---|---|---|---|
| CN | 111828627 | A | 10/2020 | |
| CN | 114607767 | A | 6/2022 | |
| CN | 219115422 | U | 6/2023 | |
| CN | 117578796 | A | 2/2024 | |
| DE | 102009046044 | A1 * | 5/2010 | ............ B60T 13/741 |
| KR | 20200098219 | A | 8/2020 | |
| WO | WO-2015146963 | A1 * | 10/2015 | ............ B60T 13/588 |

* cited by examiner

BRAKE-BY-WIRE (BBW) ELECTRONIC CONTROL ACTUATOR UNIT AND USE THEREOF

CROSS-REFERENCE TO THE RELATED APPLICATIONS

This application is a continuation application of International Application No. PCT/CN2024/103261, filed on Jul. 3, 2024, which is based upon and claims priority to Chinese Patent Application No. 202410061303.8, filed on Jan. 16, 2024, the entire contents of which are incorporated herein by reference.

TECHNICAL FIELD

The present disclosure relates to the technical field of automobile braking, and in particular to a brake-by-wire (BBW) electronic control actuator unit and a use thereof.

BACKGROUND

With rapid development of new energy vehicle (NEV) technologies and intelligent driving vehicle technologies, vehicle systems are becoming more integrated, electrified and secured. From the vacuum-assisted brake system of the earliest fuel vehicle to the electro-hydraulic brake system (EHB) of an NEV, brake systems realize an autonomous pressure reduction function and a brake boosting function. The EHB has been applied by many automobile companies to NEVs and put into mass production for its simple structure, high feasibility, and low technical difficulty. However, since the brake fluid still serves as a working medium of the EHB, a hydraulic pipeline, a pressure mechanism, and a hydraulic actuating mechanism are required, which makes the whole arrangement relatively complex. Moreover, the brake fluid needs to be replaced regularly. The vehicle stability control (VSC) function and the anti-lock brake function are realized with the assistance of the anti-lock brake system (ABS) or the electronic stability control system (ESC), such that the integration level of the whole brake system is not high.

Instead of the EHB, the Onebox with a higher integration level still does not get rid of the brake fluid and the pipeline. It is known that transmission of the medium will involve response hysteresis and failure risks.

The further developed electro-mechanical brake system (EMB) has better integration controllability and better braking efficiency. For the EMB, the huge oil pipeline and associated mechanisms in the EHB are removed thoroughly, the mounting angle and position are more convenient, and the exhaust vent turns out to be unnecessary. Without a hydraulic medium, the EMB directly drives the gear mechanism through a motor, and then drives the friction shoe, thus achieving a fast response speed, desirable brake performance, and more convenient maintenance. The integrated controller is further used to drive an actuator of the EMB. Without an external mechanism, the EMB can realize the ABS, the traction control system (TCS), the ESC, the automatic emergency braking (AEB), etc. The EMB has a high electro-mechanical integration level and a good stability.

The motor gear transmission structure is a core actuating element of the EMB. At present, the EMB announced by most manufacturers has the following defects: The axial mounting space of the actuator unit is large. The parking function cannot be realized due to a fact that the parking mechanism is not integrated. The parking brake caliper and the parking brake mechanism need to be provided individually, such that the arrangement space is insufficient, the system structure is relatively complex, and the cost is high.

For the parking mechanism integrated EMB used by some manufacturers, the parking brake structure is composed of a ratchet mechanism and a lever mechanism, and is restored by a spring, thus causing a complex structure. In actual work, the ratchet cannot cooperate with the pawl accurately sometimes, thus reducing a service life of the mechanism.

Furthermore, in the EMB, the motor in the actuator unit is used for driving braking and parking braking at the same time. The motor usually has a high designed power, such that the size and weight of the motor are relatively large to cause high energy consumption and high heat productivity. In the continuous braking, heat from a brake disc is transmitted to the brake caliper through the brake shoe, thereby transmitting to the motor. With the addition of intrinsic working heat of the motor, the motor is very prone to a high temperature, such that the magnet temperature of the motor is risen or even the magnetic material is demagnetized permanently. While the temperature of the motor is risen, the internal resistance of the motor is also increased, thereby increasing a voltage drop and a copper loss to affect the output power of the motor.

Moreover, while the size and the weight of the motor are increased, the material of the housing of the actuator unit, as well as the mounting and fixation of the actuator unit and the brake caliper, has a direct impact on system reliability. In view of this, the electronic parking brake (EPB) actuator unit is used. However, due to a two-point fixation manner, the requirement of the EMB actuator unit on reliability cannot be met.

SUMMARY

In order to solve the above-mentioned problems, the present disclosure provides a BBW electronic control actuator unit and a use thereof. The present disclosure removes the hydraulic system, and directly integrates the motor to the brake caliper. In response to a braking requirement, an electronic control unit (ECU) controls the motor to generate a braking force, thereby realizing an all-electric operation on the braking. Without the long pipeline acting time of the hydraulic system, the present disclosure can make a more rapid braking response.

To achieve the above objective, the present disclosure provides a BBW electronic control actuator unit, including a machine body, as well as a permanent magnet brushless direct-current motor (PMBDCM) and speed-reducing torque-increasing gear sets integrated in the machine body, where the PMBDCM includes a stator assembly and a rotor assembly; the rotor assembly is connected to one end of a motor shaft; the other end of the motor shaft is connected to an input end of each of the speed-reducing torque-increasing gear sets; an output end of the speed-reducing torque-increasing gear set is connected to an output shaft; and the output shaft extends out of the machine body.

Preferably, the rotor assembly is in interference fit with the motor shaft; and the motor shaft is in interference fit or key connection with a parking locking electromagnetic assembly;

the parking locking electromagnetic assembly includes a locking disc that is in key connection or interference fit with the motor shaft and is demagnetized, a locking latch, and a locking mounting housing; a locating hole is formed at an outer circumferential side of the locking disc; the locking latch corresponds to the locating hole; and the locking latch is provided in the locking mounting housing vertically and slidably; and the locking latch is an electromagnetic latch; the electromagnetic latch is electrically connected to a power cord by sequentially passing through a wiring end provided on the locking mounting housing as well as a signal acquisition chip and a connector provided on an inner wall of the machine body; and the connector is further electrically connected to the stator assembly through the power cord.

Preferably, an anti-rotating boss is fixed on an outer wall of the locking mounting housing; an anti-rotating groove is formed in the inner wall of the machine body and corresponding to the anti-rotating boss; and the anti-rotating boss extends into the anti-rotating groove, and is configured to prevent rotation of the parking locking electromagnetic assembly in up-down movement.

Preferably, the speed-reducing torque-increasing gear set includes an input gear connected to the motor shaft, a dual gear engaged with the input gear, and an output shaft engaged with the dual gear; and the output gear is connected to the output shaft;

the input gear is connected to the motor shaft through an involute non-backlash spline, or the input gear is in interference fit with the motor shaft, or the input gear is integrally formed with the motor shaft; and the input gear, the dual gear, and the output gear are all a spur gear or a helical gear.

Preferably, the dual gear is rotatably provided at an outer side of a mandrel; and the mandrel is fixed in the machine body;

the dual gear includes a top gear and a bottom gear that are formed integrally; the top gear is engaged with the output gear; the bottom gear is engaged with the input gear; and the input gear, the top gear, the bottom gear, and the output gear are increased sequentially in number of teeth;

the top gear is rotatably connected to the mandrel through a shaft housing; and the bottom gear is rotatably connected to the mandrel through a bearing; and an annular cavity configured to store grease is formed in an inner circular surface of the shaft housing.

Preferably, a central hole of the output gear is provided with an internal involute spline; and the internal involute spline is configured to cooperate with an external involute spline at an end of the output shaft; and the output shaft includes one end extending out of the output gear and having an outer circumferential side provided with an elastic retainer ring, and the other end penetrating through the machine body; and the output shaft between the machine body and the output gear is rotatably connected to an interior of the machine body through a bearing.

Preferably, a magnetic ring assembly configured to detect a position of the motor shaft is connected through a pin shaft to an end of the motor shaft penetrating through the input gear; a locating ring configured to prevent the magnetic ring assembly from moving up and down is provided at a position of the pin shaft corresponding to the magnetic ring assembly; and an inner side of the magnetic ring assembly is clamped with the pin shaft through the locating ring; and the magnetic ring assembly is a sensor magnetic ring composed of at least one pair of magnetic poles; and the sensor magnetic ring is electrically connected to a signal line through the connector provided on the inner wall of the machine body.

Preferably, the machine body is a sealed structure composed of a body, an upper cover, and an end cover; a cover plate configured to prevent grease between the speed-reducing torque-increasing gear sets from splashing and overflowing is further provided between the upper cover and the body; and the cover plate is connected to the body through a bolt;

a sealed mounting cavity is formed among the cover plate, the body, and the end cover; and the PMBDCM and the speed-reducing torque-increasing gear sets are provided in the sealed mounting cavity;

between the upper cover and the body as well as between the end cover and the body, a sealing ring is provided or a sealant is coated; and the upper cover and the body as well as the end cover and the body are connected through a bolt or the sealant; and the upper cover is an aluminum stamping part.

Preferably, the end cover corresponds to an end of the motor shaft away from the speed-reducing torque-increasing gear set; and a wave spring configured to reduce vibration and adjust an axial clearance of the motor shaft is provided between the motor shaft and an inner wall of the end cover.

The present disclosure provides a use of the BBW electronic control actuator unit in automobile braking, where the BBW electronic control actuator units are symmetrically provided at two sides of an automobile tire, and the BBW electronic control actuator units and a brake caliper are provided in three points; and the output shaft penetrating through the machine body is connected to an internal spline at an end of the brake caliper through an external spline or an involute spline.

The present disclosure has the following beneficial effects:

1. By assembling the PMBDCM and the speed-reducing torque-increasing gear set to the integrally formed machine body, the present disclosure has advantages of a high mounting accuracy, and a compact structure. The PMBDCM can directly drive the speed-reducing torque-increasing gear set to reduce a speed and output a torque, thereby achieving higher transmission efficiency.

2. The driving brake function and the parking brake function are integrated, so the present disclosure has a high integration level. Moreover, the present disclosure is applicable to brake calipers of various sizes, because the actuator is not limited by a cylinder diameter of the brake caliper.

3. With the PMBDCM, the present disclosure can achieve the larger torque output, the longer service life of the motor, and the lower noise.

In conclusion, the whole actuator unit has the characteristics of a compact structure, a small size, a light weight, desirable heat dissipation performance and convenience in fixation and mounting.

The technical solutions of the present disclosure will be further described in detail below with reference to drawings and embodiments.

Figure 1:
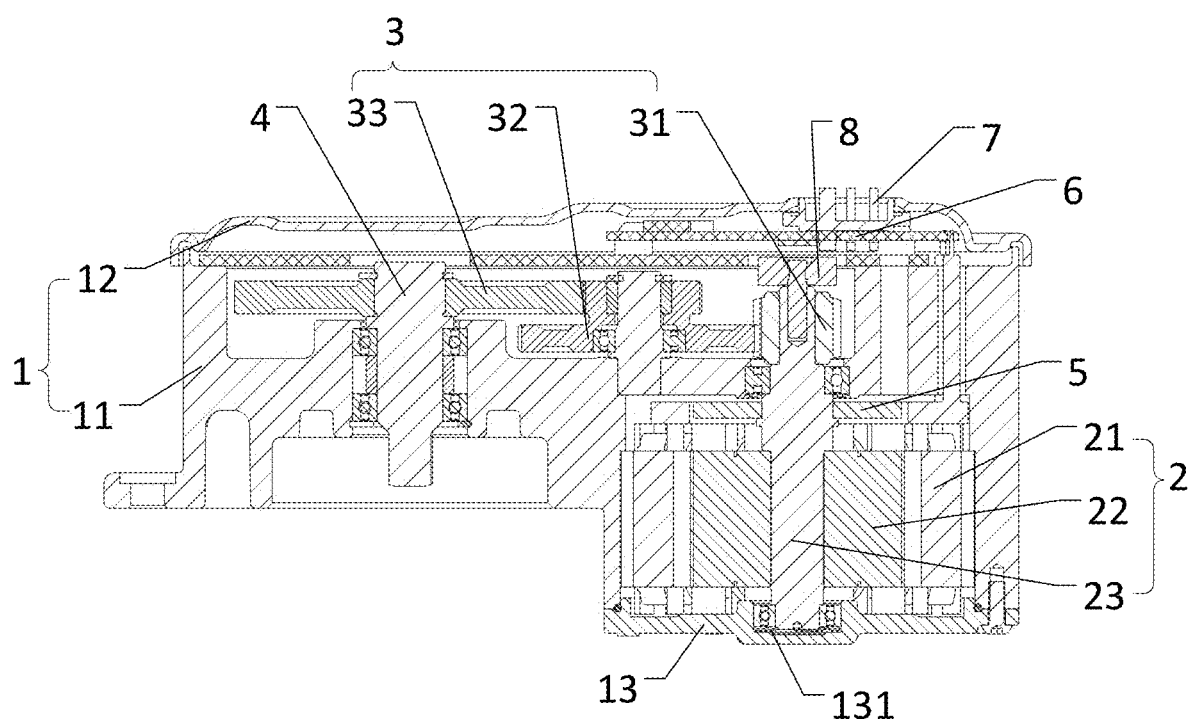
FIG. 1 is a sectional diagram of a BBW electronic control actuator unit according to the present disclosure.
Figure 2:
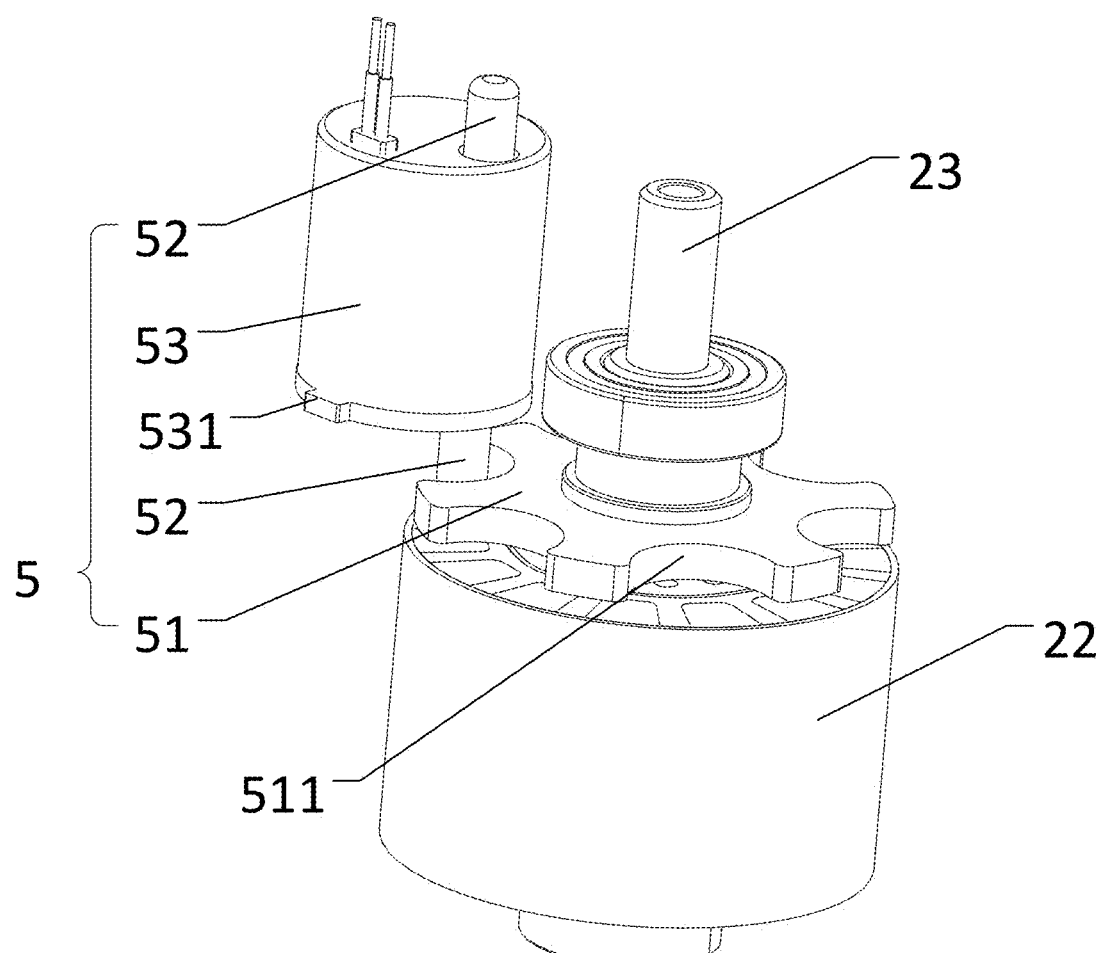
FIG. 2 is a schematic structural diagram of a parking locking electromagnetic assembly of a BBW electronic control actuator unit according to the present disclosure.
Figure 3:
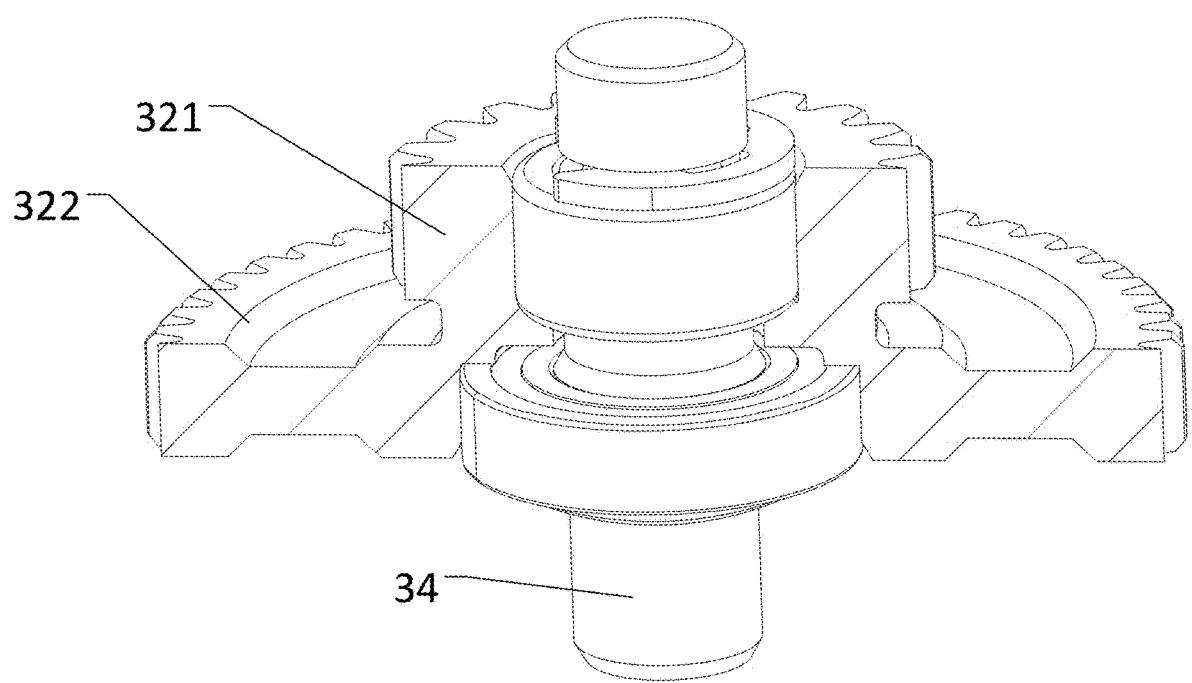
FIG. 3 is an assembly diagram of a dual gear of a BBW electronic control actuator unit according to the present disclosure.
Figure 4:
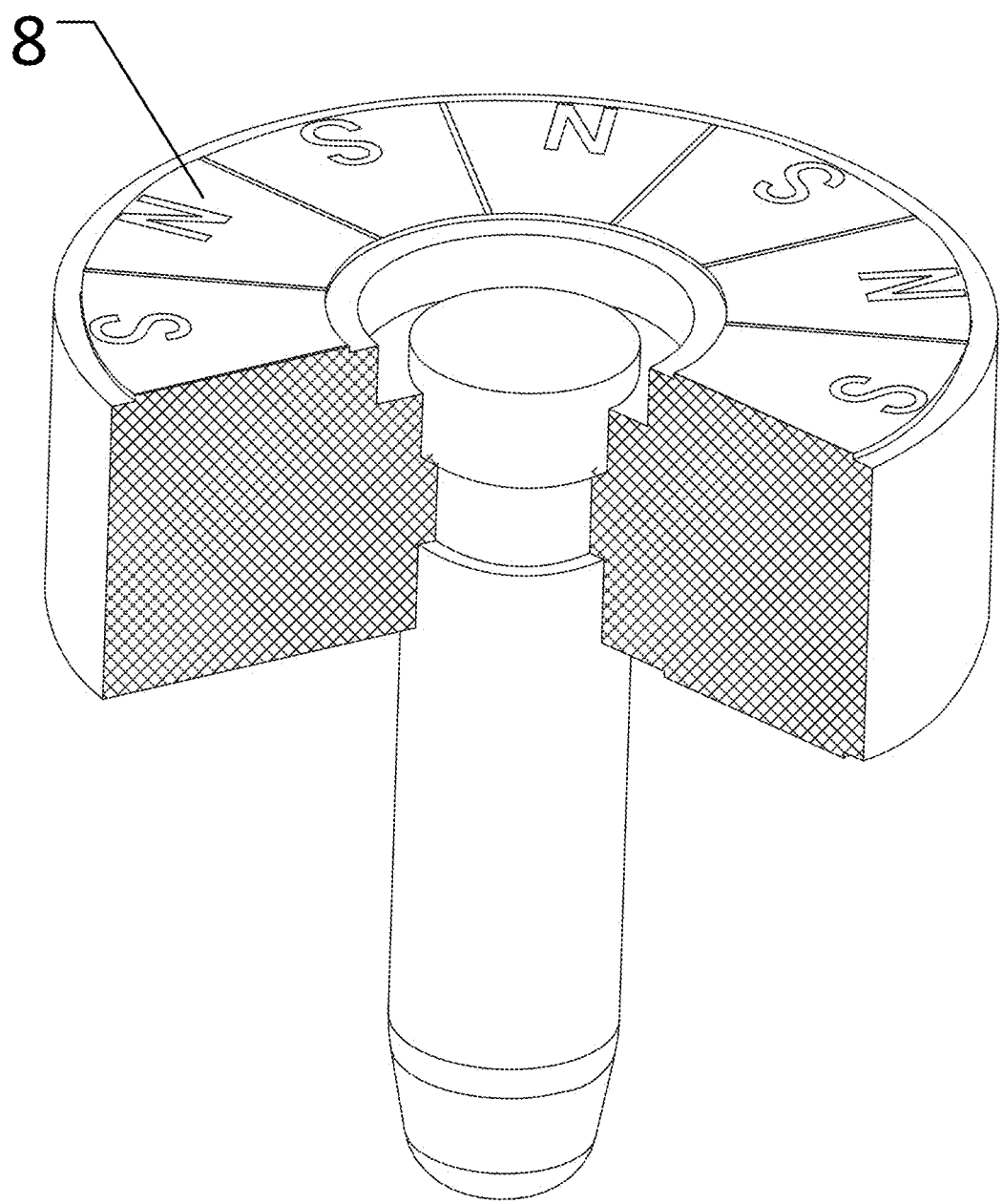
FIG. 4 is a schematic structural diagram of a magnetic ring assembly of a BBW electronic control actuator unit according to the present disclosure.
Figure 5:
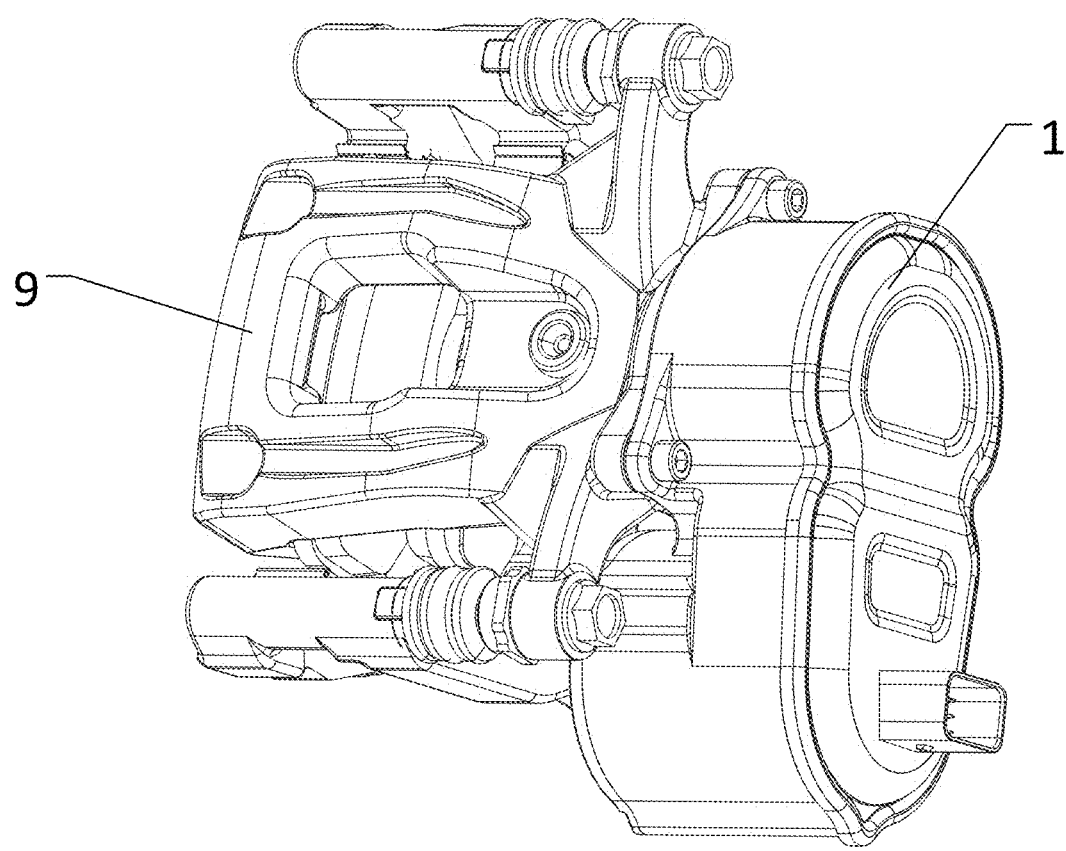
FIG. 5 is an assembly diagram of a BBW electronic control actuator unit in use according to the present disclosure.

In the figures: 1: machine body, 11: body, 12: upper cover, 13: end cover, 131: wave spring, 2: PMBDCM, 21: stator assembly, 22: rotor assembly, 23: motor shaft, 3: speed-reducing torque-increasing gear set, 31: input gear, 32: dual gear, 321: top gear, 322: bottom gear, 33: output gear, 34: mandrel, 4: output shaft, 5: parking locking electromagnetic assembly, 51: locking disc, 511: locating hole, 52: locking latch, 53: locking mounting housing, 531: anti-rotating boss, 6: signal acquisition chip, 7: connector, 8: magnetic ring assembly, and 9: brake caliper.

DETAILED DESCRIPTION OF THE EMBODIMENTS

In order to make the objectives, technical solutions, and advantages in the embodiments of the present disclosure clearer, the present disclosure is further described in detail below with reference to the accompanying drawings and embodiments. It should be understood that the specific embodiments described herein are only intended to explain the present disclosure and are not intended to limit the present disclosure. All other embodiments obtained by those of ordinary skill in the art based on the embodiments of the present disclosure without creative efforts should fall within the protection scope of the present disclosure. The reference numerals of the embodiments are shown in the accompanying drawings. The same or similar numerals represent the same or similar elements (with the same or similar functions) throughout the specification.

It is to be noted that the terms "include", "comprise", and their variants in the embodiments of the present disclosure mean to cover a non-exclusive inclusion. For example, a process, method, system, product or device that includes a list of steps or units is not necessarily limited to those steps or units which are clearly listed. Instead, they may include other steps or units which are not expressly listed or inherent.

Similar reference signs and letters represent similar items in the accompanying drawings below. Therefore, once an item is defined in one accompanying drawing, it does not need to be further defined and described in subsequent accompanying drawings.

In the description of the present disclosure, it should be noted that orientations or position relationships indicated by terms such as "upper", "lower", "inner", and "outer" are orientation or position relationships shown in the accompanying drawings, and these terms are only used to facilitate description of the present disclosure and simplify the description, but not to indicate or imply that the mentioned apparatus or components must have a specific orientation or must be established and operated in a specific orientation, and thus these terms cannot be understood as a limitation to the present disclosure.

In the description of the present disclosure, it should be noted that, unless otherwise clearly specified and limited, meanings of terms "disposed", "installed", and "connected with" should be understood in a board sense. For example, the connection may be a fixed connection, a removable connection, or an integral connection; may be a mechanical connection or an electrical connection; may be a direct connection or an indirect connection through an intermediate medium; or may be intercommunication between two components. Those of ordinary skill in the art may understand specific meanings of the foregoing terms in the present disclosure based on a specific situation.

As shown in FIG. 1 to FIG. 5, a BBW electronic control actuator unit includes machine body 1, as well as PMBDCM 2 and speed-reducing torque-increasing gear sets 3 integrated in the machine body 1. The PMBDCM 2 includes stator assembly 21 and rotor assembly 22. The rotor assembly 22 is connected to one end of motor shaft 23. The other end of the motor shaft 23 is connected to an input end of each of the speed-reducing torque-increasing gear sets 3. An output end of the speed-reducing torque-increasing gear set 3 is connected to output shaft 4. The output shaft 4 extends out of the machine body 1.

Specifically, the rotor assembly 22 is in interference fit with the motor shaft 23. In work, the motor shaft 23 rotates synchronously with the rotor assembly 22. The motor shaft 23 is in interference fit or key connection with parking locking electromagnetic assembly 5. The parking locking electromagnetic assembly 5 includes locking disc 51 that is in key connection or interference fit with the motor shaft 23 and is demagnetized (since the locking disc 51 is close to the rotor assembly 22, the locking disc 51 is demagnetized or made of a non-magnetic material, thereby preventing influences of the locking disc 51 on the rotor assembly), a locking latch, and locking mounting housing 53. Locating hole 511 is formed at an outer circumferential side of the locking disc 51. In the embodiment, a plurality of locating holes 511 are uniformly provided at the outer circumferential side of the locking disc 51. The locking latch 52 corresponds to the locating hole 511. The locking latch 52 is provided in the locking mounting housing 53 vertically and slidably. The locking latch 52 is an electromagnetic latch. The electromagnetic latch is electrically connected to a power cord by sequentially passing through a wiring end provided on the locking mounting housing 53 as well as signal acquisition chip 6 and connector 7 provided on an inner wall of the machine body 1. The connector 7 is further electrically connected to the stator assembly 21 through the power cord. By communicating with an external controller through the connector 7, the present disclosure controls positive and negative rotation of the motor according to a braking requirement of the whole vehicle, and realizes deceleration and parking in vehicle braking through clamping and releasing actions of brake caliper 9. Meanwhile, by inserting the locking latch into the locating hole 511 of the locking disc, the present disclosure can prevent free rotation between the locking disc and the motor shaft 23, thereby locking the motor and realizing a vehicle parking function.

Preferably, anti-rotating boss 531 is fixed on an outer wall of the locking mounting housing 53. An anti-rotating groove is formed in the inner wall of the machine body 1 and corresponding to the anti-rotating boss 531. The anti-rotating boss 531 extends into the anti-rotating groove, and is configured to prevent rotation of the parking locking electromagnetic assembly 5 in up-down movement.

Preferably, the speed-reducing torque-increasing gear set 3 includes input gear 31 connected to the motor shaft 23, dual gear 32 engaged with the input gear 31, and output shaft 33 engaged with the dual gear 32. The output gear 33 is connected to the output shaft 4. The input gear 31 is connected to the motor shaft 23 through an involute non-backlash spline, or the input gear 31 is in interference fit with the motor shaft 23, or the input gear 31 is integrally formed with the motor shaft 23. The input gear 31, the dual gear 32, and the output gear 33 are all a spur gear or a helical gear.

Preferably, the dual gear 32 is rotatably provided at an outer side of mandrel 34. The mandrel 34 is fixed in the machine body 1. The dual gear 32 includes top gear 321 and bottom gear 322 that are formed integrally. The top gear 321 is engaged with the output gear 33. The bottom gear 322 is engaged with the input gear 31. The input gear 31, the top gear 321, the bottom gear 322, and the output gear 33 are increased sequentially in number of teeth. The top gear 321 is rotatably connected to the mandrel 34 through a shaft housing. The bottom gear 322 is rotatably connected to the mandrel 34 through a bearing. An annular cavity configured to store grease is formed in an inner circular surface of the shaft housing.

Preferably, a central hole of the output gear 33 is provided with an internal involute spline. The internal involute spline is configured to cooperate with an external involute spline at an end of the output shaft 4 to realize torque transmission. With the splined cooperation, the present disclosure can transmit a larger torque, and is more applicable to transmission in the positive and negative rotation. The output shaft 4 includes one end extending out of the output gear 33 and having an outer circumferential side provided with an elastic retainer ring, and the other end penetrating through the machine body 1. The output shaft 4 between the machine body 1 and the output gear 33 is rotatably connected to an interior of the machine body 1 through a bearing.

Preferably, magnetic ring assembly 8 configured to detect a position (phase angle) of the motor shaft 23 is connected through a pin shaft to an end of the motor shaft 23 penetrating through the input gear 31. A locating ring configured to prevent the magnetic ring assembly 8 from moving up and down is provided at a position of the pin shaft corresponding to the magnetic ring assembly 8. An inner side of the magnetic ring assembly 8 is clamped with the pin shaft through the locating ring. A magnetic ring material is provided on the pin shaft by injection molding in advance before magnetized. The magnetic ring assembly 8 is a sensor magnetic ring composed of at least one pair of magnetic poles. The sensor magnetic ring is electrically connected to a signal line through the connector 7 provided on the inner wall of the machine body 1.

Preferably, the machine body 1 is a sealed structure composed of body 11, upper cover 12, and end cover 13. A cover plate configured to prevent grease between the speed-reducing torque-increasing gear sets 3 from splashing and overflowing is further provided between the upper cover 12 and the body 11. The cover plate is connected to the body 11 through a bolt. This prevents the grease of the gear from overflowing, can prevent entry of external foreign matters, and can isolate noise of engagement in gear transmission, such that the BBW electronic control actuator unit achieves a desirable comfort on the vehicle. A sealed mounting cavity is formed among the cover plate, the body 11, and the end cover 13. The PMBDCM 2 and the speed-reducing torque-increasing gear sets 3 are provided in the sealed mounting cavity. Between the upper cover 12 and the body 11 as well as between the end cover 13 and the body 11, a sealing ring is provided or a sealant is coated. The upper cover 12 and the body 11 as well as the end cover 13 and the body 11 are connected through a bolt or the sealant. The upper cover 12 is an aluminum stamping part, with a desirable heat dissipation function. Meanwhile, the body 11 is an aluminum die casting alloy structure, which can ensure the strength and the light weight, and can provide better heat dissipation for the motor.

Preferably, the end cover 13 corresponds to an end of the motor shaft 23 away from the speed-reducing torque-increasing gear set 3. Wave spring 131 configured to reduce vibration and adjust an axial clearance of the motor shaft 23 is provided between the motor shaft 23 and an inner wall of the end cover 13.

Figure 6:
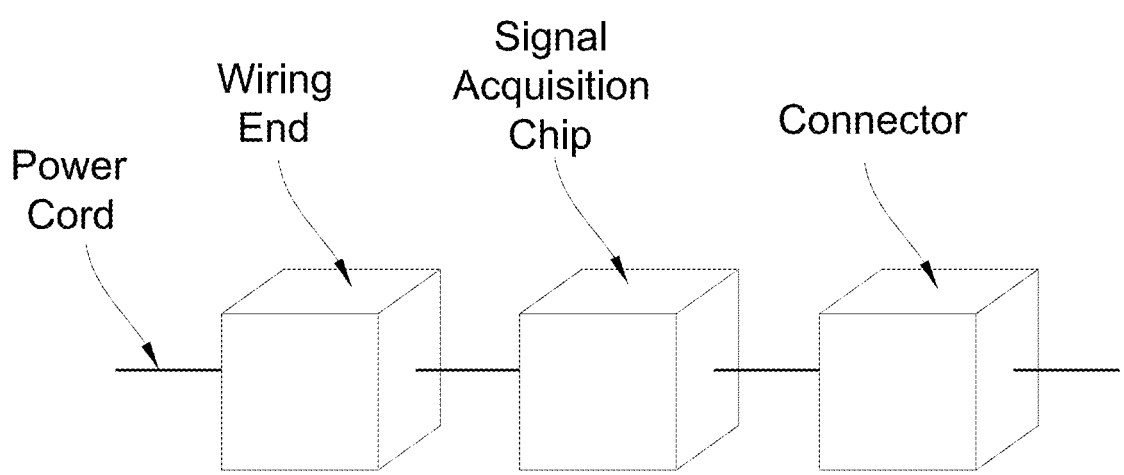
FIG. 6 is added schematically illustrating a power cord sequentially passing through a wiring end provided on the locking mounting housing, a signal acquisition chip, and a connector provided on an inner wall of the machine body.

FIG. 6 schematically illustrating a power cord sequentially passing through a wiring end provided on the locking mounting housing, a signal acquisition chip, and a connector provided on an inner wall of the machine body.

The present disclosure provides a use of the BBW electronic control actuator unit in automobile braking. The BBW electronic control actuator units are symmetrically provided at two sides of an automobile tire. The BBW electronic control actuator units and brake caliper 9 are provided in three points. The output shaft 4 penetrating through the machine body 1 is connected to an internal spline at an end of the brake caliper 9 through an external spline or an involute spline.

Therefore, according to the BBW electronic control actuator unit and the use thereof provided by the present disclosure, by assembling the PMBDCM and the speed-reducing torque-increasing gear set to the integrally formed machine body, the present disclosure has advantages of a high mounting accuracy, and a compact structure. The PMBDCM can directly drive the speed-reducing torque-increasing gear set to reduce a speed and output a torque, thereby achieving higher transmission efficiency.

Finally, it should be noted that the foregoing embodiments are only intended to describe, rather than to limit the technical solutions of the present invention. Although the present disclosure is described in detail with reference to the preferred embodiments, a person of ordinary skill in the art should understand that modifications or equivalent replacements may be made to the technical solutions of the present disclosure without departing from the spirit and scope of the technical solutions of the present disclosure.

What is claimed is:

1. A brake-by-wire (BBW) electronic control actuator unit, comprising a machine body, as well as a permanent magnet brushless direct-current motor (PMBDCM) and speed-reducing torque-increasing gear sets integrated in the machine body, wherein the PMBDCM comprises a stator assembly and a rotor assembly; the rotor assembly is connect to a first end of a motor shaft; a second end of the motor shaft is connect to an input end of one of the speed-reducing torque-increasing gear sets; an output end of the speed-reducing torque-increasing gear sets is connected to an output shaft; and the output shaft extends out of the machine body;
   wherein the rotor assembly is in interference fit with the moto shaft; and the motor shaft is in interference fit or key connection with a parking locking electromagnetic assembly;
   the parking locking electromagnetic assembly comprises a locking disc that is in key connection or interference fit with the motor shaft and is demagnetize, a locking latch, and a locking mounting housing; a locating hole is formed at an outer circumferential side of the locking disc; the locking latch corresponds to the locating hole;

and the locking latch is provided in the locking mounting housing vertically and slidably; and the locking latch is an electromagnetic latch the electromagnetic latch is electrically connected to a power cord by sequentially passing through a wiring end provided on the locking mounting housing, a signal acquisition chip and a connector provided on an inner wall of the machine body; and the connector is further electrically connected to the stator assembly through the power cord.

2. The BBW electronic control actuator unit according to claim 1, wherein an anti-rotating boss is fixed on an outer wall of the locking mounting housing; and anti-rotating groove is formed in the inner wall of the machine body and corresponding to the anti-rotating boss; and the anti-rotating boss extends into the anti-rotating groove, and is configured to prevent rotation of the parking locking electromagnetic assembly in up-down movement.

3. The BBW electronic control actuator unit according to claim 1, wherein the speed-reducing torque-increasing gear sets comprises an input gear connected to the motor shaft, a dual gear engaged with the input gear, and an output gear engaged with the dual gear; and the output gear is connected to the output shaft;

the input gear is connected to the motor shaft through an involute non-backlash spline, or the input gear is in interference fit with the motor shaft, or the input gear is integrally formed with the motor shaft; and the input gear, the dual gear, and the output gear are all a spur gear or a helical gear.

4. The BBW electronic control actuator unit according to claim 3, wherein the dual gear is rotatably provided at an outer side of a mandrel; and the mandrel is fixed in the machine body;

the dual gear comprises a top gear and a bottom gear that are formed integrally; the top gear is engaged with the output gear; the bottom gear is engaged with the input gear; and the input gear, the top gear, the bottom gear, and the output gear are increased sequentially in number of teeth;

the top gear is rotatably connected to the mandrel through a shaft housing; and the bottom gear is rotatably connected to the mandrel through a bearing; and an annular cavity configured to store grease is formed in an inner circular surface of the shaft housing.

5. The BBW electronic control actuator unit according to claim 3, wherein a central hole of the output gear is provided with an internal involute spline; and the internal involute spline is configured to cooperate with an external involute spline at an end of the output shaft; and the output shaft comprises a first end extending out of the output gear and having an outer circumferential side provided with an elastic retainer ring, and a second end penetrating through the machine body; and the output shaft between the machine body and the output gear is rotatably connected to an interior of the machine body through a bearing.

6. The BBW electronic control actuator unit according to claim 3, wherein a magnetic ring assembly configured to detect a position of the motor shaft is connected through a pin shaft to an end of the motor shaft penetrating through the input gear; a locating ring configured to prevent the magnetic ring assembly from moving up and down is provided at a position of the pin shaft corresponding to the magnetic ring assembly; and an inner side of the magnetic ring assembly is clamped with the pin shaft through the locating ring; and the magnetic ring assembly is a sensor magnetic ring composed of at least one pair of magnetic poles; and the sensor magnetic ring is electrically connected to a signal line through the connector provided on the inner wall of the machine body.

7. The BBW electronic control actuator unit according to claim 1, wherein the machine body is a sealed structure composed of a body, an upper cover, and an end cover; a cover plate configured to prevent grease between the speed-reducing torque-increasing gear sets from splashing and overflowing is further provided between the upper cover and the body; and the cover plate is connected to the body through a bolt;

a sealed mounting cavity is formed among the cover plate, the body, and the end cover; and the PMBDCM and the speed-reducing torque-increasing gear sets are provided in the sealed mounting cavity;

between the upper cover and the body as well as between the end cover and the body, a sealing ring is provided or a sealant is coated; and the upper cover and the body as well as the end cover and the body are connected through a bolt or the sealant; and the upper cover is an aluminum stamping part.

8. The BBW electronic control actuator unit according to claim 7, wherein the end cover corresponds to the end of the motor shaft away from the speed-reducing torque-increasing gear sets; and a wave spring configured to reduce vibration and adjust an axial clearance of the motor shaft is provided between the motor shaft and an inner wall of the end cover.

9. A use of the BBW electronic control actuator unit according to claim 1 in automobile braking, wherein the BBW electronic control actuator unit is symmetrically provided at two sides of an automobile tire; and the output shaft penetrating through the machine body is connected to an internal spline at an end of the brake caliper through an external spline or an involute spline.

10. The use according to claim 9, wherein in the BBW electronic control actuator unit, an anti-rotating boss is fixed on an outer wall of the locking mounting housing; an anti-rotating groove is formed in the inner wall of the machine body and corresponding to the anti-rotating boss; and the anti-rotating boss extends into the anti-rotating groove, and is configured to prevent rotation of the parking locking electromagnetic assembly in up-down movement.

11. The use according to claim 9, wherein in the BBW electronic control actuator unit, the speed-reducing torque-increasing gear sets comprises an input gear connected to the motor shaft, a dual gear engaged with the input gear, and an output gear engaged with the dual gear; and the output gear is connected to the output shaft;

the input gear is connected to the motor shaft through an involute non-backlash spline, or the input gear is in interference fit with the motor shaft, or the input gear is integrally formed with the motor shaft; and the input gear, the dual gear, and the output gear are all a spur gear or a helical gear.

12. The use according to claim 11, wherein in the BBW electronic control actuator unit, the dual gear is rotatably provided at an outer side of a mandrel; and the mandrel is fixed in the machine body;

the dual gear comprises a top gear and a bottom gear that are formed integrally; the top gear is engaged with the output gear; the bottom gear is engaged with the input gear; and the input gear, the top gear, the bottom gear, and the output gear are increased sequentially in number of teeth;

the top gear is rotatably connected to the mandrel through a shaft housing; and the bottom gear is rotatably connected to the mandrel through a bearing; and an annular cavity configured to store grease is formed in an inner circular surface of the shaft housing.

13. The use according to claim 11, wherein in the BBW electronic control actuator unit, a central hole of the output gear is provided with an internal involute spline; and the internal involute spline is configured to cooperate with an external involute spline at an end of the output shaft; and the output shaft comprises a first end extending out of the output gear and having an outer circumferential side provided with an elastic retainer ring, and a second end penetrating through the machine body; and the output shaft between the machine body and the output gear is rotatably connected to an interior of the machine body through a bearing.

14. The use according to claim 11, wherein in the BBW electronic control actuator unit, a magnetic ring assembly configured to detect a position of the motor shaft is connected through a pin shaft to an end of the motor shaft penetrating through the input gear; a locating ring configured to prevent the magnetic ring assembly from moving up and down is provided at a position of the pin shaft corresponding to the magnetic ring assembly; and an inner side of the magnetic ring assembly is clamped with the pin shaft through the locating ring; and the magnetic ring assembly is a sensor magnetic ring composed of at least one pair of magnetic poles; and the sensor magnetic ring is electrically connected to a signal line through the connector provided on the inner wall of the machine body.

15. The use according to claim 9, wherein in the BBW electronic control actuator unit, the machine body is a sealed structure composed of a body, an upper cover, and an end cover; a cover plate configured to prevent grease between the speed-reducing torque-increasing gear sets from splashing and overflowing is further provided between the upper cover and the body; and the cover plate is connected to the body through a bolt;

a sealed mounting cavity is formed among the cover plate, the body, and the end cover; and the PMBDCM and the speed-reducing torque-increasing gear sets are provided in the sealed mounting cavity;

between the upper cover and the body as well as between the end cover and the body, a sealing ring is provided or a sealant is coated; and the upper cover and the body as well as the end cover and the body are connected through a bolt or the sealant; and the upper cover is an aluminum stamping part.

16. The use according to claim 15, wherein in the BBW electronic control actuator unit, the end cover corresponds to the end of the motor shaft away from the speed-reducing torque-increasing gear sets; and a wave spring configured to reduce vibration and adjust an axial clearance of the motor shaft is provided between the motor shaft and an inner wall of the end cover.

\* \* \* \* \*